United States Patent [19]

Kawamura et al.

[11] 4,302,083
[45] Nov. 24, 1981

[54] AUTOMATIC EXPOSURE CONTROL CAMERA WITH MEANS TO LOCK CONTINUOUSLY RENEWED EXPOSURE CONTROL DATA IN A MEMORY

[75] Inventors: Masaharu Kawamura, Kawasaki; Masanori Uchidoi, Yokohama, both of Japan

[73] Assignee: Canon Kabushiki Kaisha, Tokyo, Japan

[21] Appl. No.: 127,072

[22] Filed: Mar. 4, 1980

[30] Foreign Application Priority Data

Mar. 12, 1979 [JP] Japan .................................. 54-28547

[51] Int. Cl.$^3$ ............................................ G03B 7/093
[52] U.S. Cl. .................................... 354/23 D; 354/38; 354/60 R
[58] Field of Search .................... 354/23 D, 38, 50, 51, 354/60 R, 267; 250/206; 313/94; 356/218

[56] References Cited

U.S. PATENT DOCUMENTS

| | | | |
|---|---|---|---|
| 4,191,459 | 3/1980 | Saito | 354/23 D |
| 4,200,375 | 4/1980 | Ishiguro | 354/23 D |

FOREIGN PATENT DOCUMENTS

| | | |
|---|---|---|
| 2607544 | 2/1977 | Fed. Rep. of Germany . |
| 2757852 | 6/1978 | Fed. Rep. of Germany ........ 354/50 |

*Primary Examiner*—L. T. Hix
*Assistant Examiner*—Stafford D. Schreyer
*Attorney, Agent, or Firm*—Toren, McGeady & Stanger

[57] ABSTRACT

In the automatic exposure control camera disclosed, a memory has data stored therein on the basis of the object brightness and is periodically reset by a reset device to obtain new brightness data, while an exposure control controls exposure on the basis of the data. A signal device ordinarily produces a first signal but locks into a second signal after an external operation. A gate arrangement between the memory and the reset device passes reset signals to the memory, but responds to the second signal to inhibit the reset so as to latch the content of the memory.

5 Claims, 1 Drawing Figure

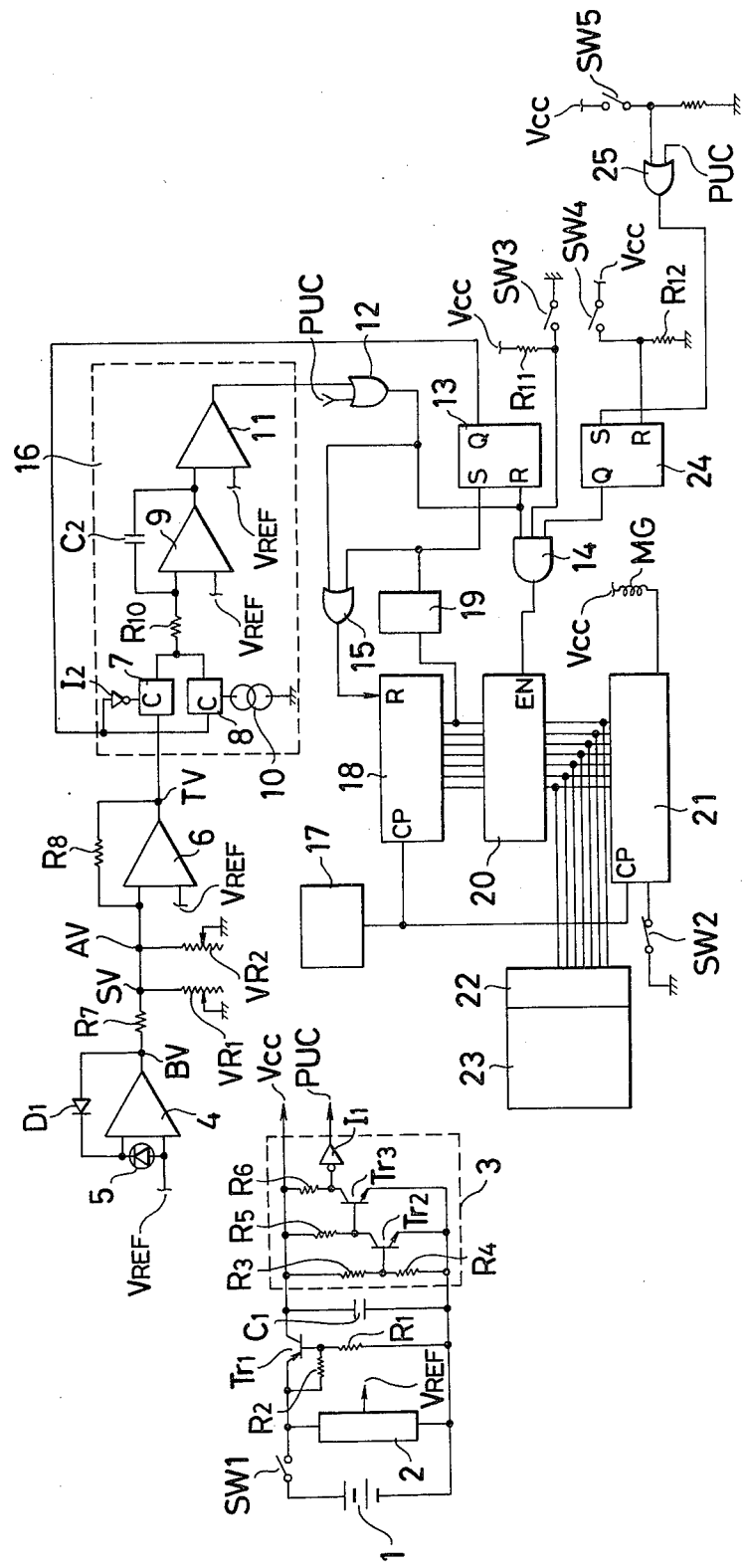

AUTOMATIC EXPOSURE CONTROL CAMERA WITH MEANS TO LOCK CONTINUOUSLY RENEWED EXPOSURE CONTROL DATA IN A MEMORY

BACKGROUND OF THE INVENTION

1. Field of the Invention

This invention relates to automatic exposure cameras, and particularly to such cameras in which a memory stores photographic data, and suitable facilities lock the content in the memory.

2. Description of the Prior Art

In use, single lens reflex cameras having automatic exposure control apparatus store brightness information or computed exposure values in memories just prior to taking an exposure, automatically control the exposure on the basis of the memory content, and recycle the stored content for each subsequent exposure.

In such single lens reflex cameras, an EE lock device is used for locking the stored memory content to cause the subsequent exposure control operation to proceed on the basis of this locked memory content.

This EE lock device is placed in operation when the photographer desires to take a continuous succession of exposures for the same object brightness, or when an exposure is to take into account the brightness of a subject of principal photographic interest that differs extensively from that of the environment surrounding the subject. In a conventional type of EE lock device as the object brightness is measured, the light value or derived exposure value is stored in a memory. If the stored value is to be locked, only when a lock button is pushed to actuate a switch, is it possible to lock the memory content of the memory with the EE lock mechanism.

The conventional EE lock mechanism, therefore, locks only when the lock control button is pushed to actuate the switch. When the switch is released from the actuation, the locking is also released.

For this reason, where the camera is hand held, a photographer uses his right hand for actuating the release button, and his left hand for turning the distance adjusting ring. To take an EE lock shot, the lock control button must be depressed continuously by either one of his hands during the above-described exposure operation. This is very troublesome and inconvenient to handle.

SUMMARY OF THE INVENTION

An object of the present invention is to eliminate the above described conventional drawbacks. According to a feature of the invention, gate means pass a signal for periodically renewing the memory content of the memorizing means, and signal forming means serve for producing signals controlling the passing and blocking of a signal for renewing purposes through and at the gate means. Hence, the signal forming means generates, through the external push-down operation of a switch, a signal which makes it possible to prevent renewing of the memory content of the memorizing means and continues to generate the second signal even after the push-down operation of the switch is released.

This and object objects of the present invention will become apparent from the following description of practical embodiments thereof.

BRIEF DESCRIPTION OF THE DRAWINGS

The FIGURE is an electrical circuit diagram of one embodiment of an automatic exposure camera according to the present invention.

DESCRIPTION OF THE PREFERRED EMBODIMENT

In the drawing, an exposure control circuit of the camera includes an electrical power source or battery 1, a power switch SW1, and a constant voltage circuit 2 connected through the power switch SW1 to the battery 1. The constant voltage of the constant voltage circuit 2 is applied as a reference voltage $V_{REF}$ to various operational amplifiers 4, 6 and 9 and a comparator 11. A transistor Tr1 has its emitter connected through the power switch SW1 to the battery 1 and with its base connected to a resistor R1. Connected in the emitter-base path of the transistor Tr1 is a resistor R2. A voltage Vcc appearing at the collector of the transistor Tr1 serves as an electrical power source voltage for the various operational amplifiers and gates. A capacitor C1 serves for stabilizing the voltage Vcc.

A power-up clear circuit 3 is composed of transistors Tr2 and Tr3, resistors R3, R4, R5 and R6 and an inverter I1. The transistor Tr2 remains non-conducting from power-up until the voltage Vcc as sensed by a voltage divider of resistors R3 and R4 has reached a lowest assurance or permissible operating voltage for the circuitry. When this transistor Tr2 is OFF, the transistor Tr3 is ON so that the output of the inverter I1 is high. This high level output PUC of the inverter I1 is applied to an OR gate 12 and a flip-flop 24.

Connected across input terminals of a light-metering operational amplifier 4 is a photo-sensitive element 5 such as a silicon photo-cell. A compression diode D1 is connected between the input and the output terminals of the operational amplifier 4. This operational amplifier 4 produces an output representing logarithmically compressed object brightness information Bv. A variable resistor VR1 for setting a film speed and a variable resistor VR2 for setting aperture information serve as signal sources for the film speed information Sv and aperture information Av.

The embodiment illustrated in the drawing is adapted to a diaphragm or aperture priority AE camera. According to another embodiment, the circuit is adapted to a shutter priority AE camera, and instead of the aperture information, the shutter speed information may be set therein.

An operational amplifier 6 of a computing circuit receives object brightness information Bv through a resistor R7, and also receives the film speed information Sv and aperture information Av. A resistor R8 is connected between the input and output terminals of the operational amplifier 6. The latter responds to the various data and produces an output representing shutter time information Tv. This shutter time information Tv from the operational amplifier 6 is applied through a first analog switch 7, and a resistor R10 to an input terminal of an operational amplifier 9. A constant current circuit 10 is connected through a second analog switch 8 and the resistor R10 to the input terminal of the operational amplifier 9 which has a capacitor C2 connected between its input and the output terminals.

The output of the operational amplifier 9 is applied to a comparator 11 which compares the output of the operational amplifier 9 with a reference voltage $V_{REF}$.

An OR gate 12 receives the output from the comparator 11 and the PUC from the power-up clear circuit 3 as inputs and produces an output which is applied to the reset terminal R of a flip-flop 13, an AND gate 14 and an OR gate 15. The output of the output terminal Q of the flip-flop 13 is applied to a C terminal of the second analog switch 8 and through an inverter I2 to a C terminal of the first analog switch 7 for controlling the ON and OFF operation of the respective analog switches. The analog switches 7 and 8, inverter I2, constant current circuit 10, operational amplifier 9, comparator 11, and condenser C2 form an analog-to-digital conversion circuit 16.

A counter 18 serves for counting the clock pulses from a clock pulse generator 17. Applied to this counter 18 at its reset terminal R is the output of the OR gate 15. The input of a one-shot circuit 19 receives the output of the 7th bit of the counter 18, and the output of the one-shot circuit 19 is applied to an OR gate 15 and the set terminal S of the flip-flop 13. A register 20 stores the 7th bit output of the counter 18 when the output of the AND gate 14 is applied to the register 20 at its EN terminal. A real or actual time elongation circuit 21 generates an actual time for the exposure with the clock pulses from the clock pulse generator 17 on the basis of the output of the register 20. This actual time elongation circuit 21 controls a magnet Mg that serves for shutter closure. A decoder driver 22 receives the output of the register 20 and a display circuit 23 displays a digital exposure value with light-emitting diodes or the like within the finder. Member SW2 is a count switch arranged to be actuated when the shutter is opened. Member SW3 is a release switch arranged to be closed when a release is actuated. As the switch SW3 is opened and closed, the voltage level applied to the AND gate 14 is changed. Member R11 is a resistor and SW4 is a switch for locking the memory content in the register 20. When a lock control button (not shown) is depressed, this switch SW4 is turned on for a moment and then automatically returns. As this switch SW4 opens and closes, the voltage level applied to the reset terminal of the flip-flop 24 changes. Member R12 is a resistor. Applied to the set terminal S of the flip-flop 24 is a PUC signal from the power-up clear circuit 3 through the OR gate 25. The output of the output terminal Q of the flip-flop 24 is applied to the AND gate 14.

When the memory content of the register 20 is not locked, the circuit operates as follows.

The operator first turns on the power switch SW1, thereby turning on the transistor Tr1. Then, the voltage Vcc is applied to the various operational amplifiers, various gates and other circuits. Until this voltage Vcc attains the lowest assurance, or required operation voltage for the circuits, the prescribed ones of the circuits are cleared up to the initial state by the clear signal PUC of the power-up clear circuit 3. That is, since the voltage Vcc assumes a value below the lowest assurance voltage value at the time of closure of the power switch SW1, the voltage divided by the resistors R3 and R4 cause the transistor Tr3 to be turned on, thus changing the output of the inverter I1 to a high level. This change of the output of the inverter I1 to high causes production of the clear signal PUC which is applied to the set terminal of the flip-flop 24 so that the output at the output terminal Q of the flip-flop 24 is high. Also the clear signal PUC is applied through the OR gates 12 and 15 to the reset terminal of the counter 18, so that the counter 18 is reset. Furthermore, the clear signal PUC is applied through the OR gate 12 to the reset terminal R of the flip-flop 13, so that the output at the output terminal Q of the flip-flop 13 is changed to low. This low level signal from the output terminal Q of the flip-flop 13 after having been inverted by the inverter I2 is applied to the C terminal of the analog switch 7, so that the analog switch 7 is turned on.

When the voltage Vcc exceeds the lowest assurance voltage value, the transistor Tr2 is turned on causing the transistor Tr3 to turn off, and therefore, causing the output of the inverter I1 to change to a low level. For this reason, the resetting of the counter 18 is released and the counter 18 starts to count the pulses from the clock pulse generator 17. However, the output at the output terminal Q of the flip-flop 13 remains low, and the output at the output terminal Q of the flip-flow 24 high.

On the other hand, closure of the power switch SW1 also causes the voltage Vcc to be applied to the various operational amplifiers. For this reason, the photo-current resulting from the photoelectric conversion by the photosensitive element 5 is logarithmically compressed by the diode D1 and the operational amplifier 4 produces an output representing the brightness information Bv. This brightness information Bv is computed with the film speed information Sv and aperture information Av from the variable resistors VR1 and VR2 by the operational amplifier 6 to produce an output representing shutter speed information Tv. This shutter speed information Tv is applied to the analog-to-digital converter circuit 16. That is, the shutter speed information TV is applied through the analog switch 7 to the operational amplifier 9, and charging of the capacitor C2 connected in the feedback network of the operational amplifier 9 is charged.

When a predetermined number of pulses have been counted by the counter 18, and the output at the 7th bit of the counter 18 changes to high, this signal triggers the one-shot circuit 19 which produces a high at the output thereof. This high level signal is applied through the OR gate 15 to the counter 18, so the counter 18 is reset.

At the same time, the high level output of the one-shot circuit 19 is applied to the set terminal S of the flip-flop 13, so the output at the output terminal Q of the flip-flop 13 is changed to high. For this reason, the analog switch 7 is turned off, and the analog switch 8 is turned on. Then, the capacitor C2 starts to discharge. Then, the capacitor C2 starts to discharge. When the output of the operational amplifier 9 reaches the reference voltage $V_{REF}$, the output of the comparator 11 is reversed to high. This high level output of the comparator 11 is applied through the OR gate 12 to the AND gate 14. Since the AND gate 14 is enabled by the high Q at flip-flop 24 and the high Vcc at resistor R11, the high level output is applied to the register 20 at the EN terminal thereof. For this reason, the counted value of the counter 18 is transferred to the register 20. At the same time, the high level output of the comparator 11 is applied through the OR gates 12 and 15 to the reset terminal of the counter 18, so the counter 18 is reset. Further, since the high level output of the comparator 11 is applied through the OR gate 12 to the flip-flop 13 at the reset terminal R thereof, the output of the output terminal Q of the flip-flop 13 is changed to low at which the analog switch 7 is turned on again, and the analog switch 8 is turned off.

It will be appreciated from the foregoing that each time one cycle of analog-to-digital conversion of the shutter speed information is completed, the shutter speed information converted to digital information by the analog-digital converter circuit 16 is transferred from the counter 18 to and stored in the register 20. This A/D conversion process repeats periodically and continuously. Therefore, the data stored in the register 20 is periodically renewed.

During the counting and storing operation, when the release switch SW3 is turned on by the actuation of a release, this low level signal sets the AND gate 14 to the off state. Upon application of this signal to the register 20, the concurrently stored memory content is held. After actuation of release, a mechanical shutter of known construction starts to operate and the count start switch SW2 is turned on. From this time onward, the actual time elongation circuit counts the clock pulses. When the number of pulses counted coincides with the memory content of the register 20, the magnet MG is actuated to terminate the exposure.

The memory content of the storage register 20 is processed by the decoder driver 22 and is displayed by the display circuit 23 in luminous form within the finder. The actual elongation time circuit, decoder driver and display circuit may be constructed in known form, and therefore, a detailed explanation of them is omitted here.

When the memory content of the register 20 is to be locked, the system works as follows. While the A/D conversion process is being carried out, the operator needs to push the lock button (not shown) to close the switch SW4 for a moment. Since the flip-flop 24 is first set by the clear signal PUC and the output at the output terminal Q is held at high level, when the switch SW4 is closed for a moment, the voltage Vcc is applied to the reset terminal R of the flip-flop 24 and the flip-flop 24 is reset. For this reason, the output at the output terminal Q of the flip-flop 24 is changed to low. This low level signal disables the AND gate 14 so that after closure of the EE lock switch SW4, the storage register 20 is prevented from renewing the memory content. Therefore, the output of the A/D converter produced in the cycle preceding the time of closure of the switch SW4 is transferred to and stored in the register 20.

The memory content of the register 20 is held so long as the power switch SW1 is ON, so that the exposure and display are controlled in accordance with this data as in the above-described case. In order to release the locking of the memory content of the register 20, the power switch SW1 may be temporarily turned off. But preferably, a separate switch SW5 releases the lock connected to the set terminal S of the flip-flop 24 through the OR gate 25, so that the register 20 can be easily released from the locking of the memory content without causing all power supply to be cut off by opening the power switch SW1.

Thus, in the EE locking method according to the present invention, when an EE lock exposure is to be made, the operator only needs to push down for a moment and may proceed to handle the camera as when he takes shots in the ordinary mode. This is so because the exposure value derived from the object brightness occurring at the time of depression of the lock button continues to be stored. Thus, the camera of the present invention is very convenient and handy to use. Even when a continuous succession of frame exposures are to be made with the help of a motor drive unit, the setting of the EE lock device makes it possible to maintain all the exposures at the same level. Another advantage derived from the quick and easy releasing of the exposure control apparatus from the EE lock as it is effected by closing the switch for a moment is that the ordinary exposure mode can be regained at any desired time. This advantage is great particularly when it is necessary to change the exposure mode during a continuous succession of frame exposures.

What is claimed is:
1. An automatic exposure control camera comprising:
   (a) memory means having data content stored therein on the basis of object brightness information;
   (b) exposure control means for controlling an exposure on the basis of the content in said memory means;
   (c) renewing means capable of periodically renewing the memory content of the memory means for producing a renewing signal which renews the memory content of the memory means;
   (d) signal forming means for producing one of a first signal and a second signal and for converting the first signal to the second signal in response to external operations and for continuing to produce the second signal even after the external operation ends; and
   (e) gate means between said memory means and said renewing means and responsive to the first signal from said signal forming means for passing the renewing signal from said renewing means to said memory means therethrough, and responsive to the second signal from said signal forming means for inhibiting passage of the renewing signal from said renewing means so that the memory content of said memory means is locked.

2. A camera according to claim 1, further including:
   a switch means for causing said signal forming means to produce a second signal so that said signal forming means changes its output from said first signal to said second signal when said switch means is actuated.

3. A camera according to claim 2, wherein said signal forming means is a flip-flop, and said flip-flop produces the first signal when in the set state and the second signal when in the reset state.

4. A camera according to claim 2, further including:
   a power-up clear circuit for causing said signal forming means to produce the first signal so that when the electrical power source is actuated said power-up clear circuit produces a clear signal which causes said signal forming means to produce the first signal.

5. A camera according to claim 2, further including:
   second switch means for causing said signal forming means to produce the first signal so that after said switch means has been actuated, said signal forming means produces the second signal, and after the second switch means is actuated, said signal forming means again produces the first signal.

* * * * *